United States Patent
Fujieda et al.

(10) Patent No.: US 11,492,685 B2
(45) Date of Patent: **\*Nov. 8, 2022**

(54) ALLOY MEMBER, PROCESS FOR PRODUCING SAID ALLOY MEMBER, AND PRODUCT INCLUDING SAID ALLOY MEMBER

(71) Applicant: HITACHI METALS, LTD., Tokyo (JP)

(72) Inventors: Tadashi Fujieda, Tokyo (JP); Hiroshi Shiratori, Tokyo (JP); Kousuke Kuwabara, Tokyo (JP); Atsuhiko Onuma, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 597 days.

This patent is subject to a terminal disclaimer.

(21) Appl. No.: 16/330,744

(22) PCT Filed: Aug. 9, 2018

(86) PCT No.: PCT/JP2018/029895
§ 371 (c)(1),
(2) Date: Mar. 5, 2019

(87) PCT Pub. No.: WO2019/031577
PCT Pub. Date: Feb. 14, 2019

(65) Prior Publication Data
US 2019/0226058 A1 Jul. 25, 2019

(30) Foreign Application Priority Data

Aug. 9, 2017 (JP) .............................. JP2017-154657

(51) Int. Cl.
*C22C 30/00* (2006.01)
*C22C 19/07* (2006.01)
(Continued)

(52) U.S. Cl.
CPC ................ *C22C 30/00* (2013.01); *B22F 1/00* (2013.01); *B22F 3/105* (2013.01); *B22F 3/16* (2013.01);
(Continued)

(58) Field of Classification Search
CPC ......... B33Y 70/00; B33Y 80/00; C22C 19/07; C22C 30/00
See application file for complete search history.

(56) References Cited

U.S. PATENT DOCUMENTS 11,141,791 B2 * 10/2021 Fujieda ................... B22F 9/082
2004/0033158 A1 2/2004 Chiba et al.
(Continued)

FOREIGN PATENT DOCUMENTS

| CN | 108699643 A | 10/2018 |
| EP | 3415652 A1 | 12/2018 |

(Continued)

OTHER PUBLICATIONS

Chou, Y. L., J. W. Yeh, and H. C. Shih. "The effect of molybdenum on the corrosion behaviour of the high-entropy alloys Co1. 5CrFeNi1. 5Ti0. 5Mox in aqueous environments." Corrosion Science 52.8 (2010): 2571-2581. (Year: 2010).*

(Continued)

*Primary Examiner* — Anthony J Zimmer
*Assistant Examiner* — Sean P. O'Keefe
(74) *Attorney, Agent, or Firm* — Rothwell, Figg, Ernst & Manbeck, P.C.

(57) ABSTRACT

Provided are: an alloy member that is excellent in homogeneity of both the alloy composition and microstructure and excellent in shape controllability and includes a high entropy alloy having high mechanical properties and high corrosion resistance, a process for producing the same, and a product including the alloy member.

(Continued)

In the present invention, the alloy member having a chemical composition comprising elements of Co, Cr, Fe, Ni, and Ti each in an amount within a range of 5 atomic % or more and 35 atomic % or less and Mo in an amount within a range of more than 0 atomic % and 8 atomic % or less, the reminder consisting of unavoidable impurities, wherein ultrafine grains having an average grain diameter of 100 nm or less are dispersed and precipitated in a parent phase crystal.

12 Claims, 7 Drawing Sheets

(51) Int. Cl.
*B22F 9/08* (2006.01)
*B22F 3/105* (2006.01)
*C22C 1/04* (2006.01)
*B22F 3/16* (2006.01)
*B33Y 70/00* (2020.01)
*B22F 5/08* (2006.01)
*C22C 33/02* (2006.01)
*B22F 1/00* (2022.01)
*B33Y 80/00* (2015.01)

(52) U.S. Cl.
CPC .................. *B22F 5/08* (2013.01); *B22F 9/08* (2013.01); *C22C 1/04* (2013.01); *C22C 19/07* (2013.01); *C22C 33/02* (2013.01); *B22F 2009/0848* (2013.01); *B22F 2301/15* (2013.01); *B22F 2301/205* (2013.01); *B22F 2301/35* (2013.01); *B22F 2998/10* (2013.01); *B33Y 70/00* (2014.12); *B33Y 80/00* (2014.12)

(56) References Cited

U.S. PATENT DOCUMENTS

| | | |
|---|---|---|
| 2011/0286312 A1 | 11/2011 | Murakami et al. |
| 2018/0363104 A1 | 12/2018 | Fujieda et al. |
| 2019/0047049 A1 | 2/2019 | Fujieda et al. |

FOREIGN PATENT DOCUMENTS

| | | | | |
|---|---|---|---|---|
| FR | 2733416 B1 | * | 7/1997 | ............. A61K 6/842 |
| JP | 2002-173732 A1 | | 6/2002 | |
| JP | 2016023352 A | * | 2/2016 | |
| SG | 11201806759 S | | 9/2018 | |
| WO | 2010055943 A1 | | 5/2010 | |
| WO | 2017098848 A1 | | 6/2017 | |
| WO | 2017138191 A1 | | 8/2017 | |

OTHER PUBLICATIONS

He, Feng, et al. "Kinetic ways of tailoring phases in high entropy alloys." Scientific reports 6.1 (2016): 1-8 (Year: 2016).*
JP-2016023352-A English language translation (Year: 2016).*
International Search Report and Written Opinion issued in corresponding International Application No. PCT/JP2018/029895, dated Oct. 16, 2018, 4 pages.
Written Opinion issued in corresponding Singapore Application No. SG11201901923Y, dated Nov. 24, 2020, 6 pages.
Extended European Search Report issued in corresponding European Application No. EP18844725.4, dated Mar. 3, 2020, 12 pages.
Fujieda et al., "CoCrFeNiTi-based high-entropy alloy with superior tensile strength and corrosion resistance achieved by a combination of additive manufacturing using selective electron beam melting and solution treatment," Materials Letters, Nov. 11, 2016, vol. 189, pp. 148-151.
Chinese Office Action, issued in corresponding Chinese Application No. 202111194668.0, dated Mar. 28, 2022, 9 pages.

* cited by examiner

ALLOY MEMBER, PROCESS FOR PRODUCING SAID ALLOY MEMBER, AND PRODUCT INCLUDING SAID ALLOY MEMBER

CROSS REFERENCE TO RELATED APPLICATION

This application 35 U.S.C. 371 National Phase Entry Application from PCT/R2018/029895, filed Aug. 9, 2018, which claims priority to Japanese Patent Application No. 2017-154657, filed Aug. 9, 2017, the disclosures of which are incorporated herein in their entirety by reference, and priority is claimed to each of the foregoing.

TECHNICAL FIELD

The present invention relates to an alloy member produced by a powder additive manufacturing process using a high entropy alloy, a process for producing the alloy member, and a product including the alloy member.

BACKGROUND ART

Recently, as an alloy of a new technical idea which is distinguished from an alloy of a conventional technical idea (for example, an alloy obtained by adding a small amount of a plurality of subcomponent elements to one to three main component elements), high entropy alloy (High Entropy Alloy: HEA) has been proposed. HEA is defined as an alloy composed of five or more main metal elements (5 to 35 atomic % each), and it is known that the following characteristics are exerted.

Examples of the characteristics include (a) stabilization of the mixing condition due to the negative increase in the mixing entropy term in Gibbs' free energy formula; (b) diffusion delay due to complicated microstructure; (c) high hardness and reduction in temperature dependence of mechanical properties caused by high lattice distortion due to the difference in size of constituent atoms; and (d) improvement of corrosion resistance by combined effect (also called cocktail effect) due to coexistence of various elements.

For example, Patent Literature 1 (JP Patent Publication (Kokai) No. 2002-173732) discloses a high-entropy multicomponent alloy obtained by casting or synthesizing a plurality of metal elements, wherein the alloy contains 5 to 11 main metal elements and the number of moles of each main metal element is set to 5% to 30% of the total number of moles of the alloy. It also discloses that the main metal elements are selected from the metal element group consisting of aluminum, titanium, vanadium, chromium, iron, cobalt, nickel, copper, zirconium, molybdenum, palladium, and silver.

Patent Literature 1 purports that there can be provided a high-entropy multicomponent alloy having a higher hardness, higher heat resistance, and higher corrosion resistance than conventional carbon steel or alloy carbon steel in the cast condition.

CITATION LIST

Patent Literature

Patent Literature 1: JP Patent Publication (Kokai) No. 2002-173732

SUMMARY OF INVENTION

Technical Problem

However, as a result of various investigations by the present inventors on HEA, HEA tended to result in elemental segregation and tissue spots at forging due to complex alloy composition and it was difficult to obtain a homogeneous ingot. There are problems to be solved such that elemental segregation and tissue spots in the alloy member lead to variation in characteristics depending on the site, particularly, degradation of mechanical strength such as ductility, or decrease in corrosion resistance.

Since HEA has high hardness and temper softening resistance, the problem is that HEA is difficult to process by machining to produce a desired shape member. This is a major obstacle to putting the HEA member into practical use and commercializing it, which is a problem to be solved.

As described above, since HEA has attractive characteristics which cannot be obtained by conventional alloys, the HEA member provides for excellent homogeneity of the alloy composition and microstructure and excellent shape controllability, and its production process have been strongly demanded to be developed.

To meet the above demands, the object of the present invention is to provide an alloy member that is excellent in homogeneity of both the alloy composition and microstructure and excellent in shape controllability and includes a high entropy alloy (HEA) having high mechanical properties and high corrosion resistance, a process for producing the same, and a product including the alloy member.

Solution to Problem (I) One aspect of the present invention provides an alloy member including a high entropy alloy, wherein the alloy member has a chemical composition comprising elements of Co (cobalt), Cr (chromium), Fe (iron), Ni (nickel), and Ti (titanium) each in an amount within a range of 5 atomic % or more and 35 atomic % or less and Mo (molybdenum) in an amount within a range of more than 0 atomic % and 8 atomic % or less, the remainder consisting of unavoidable impurities; and ultrafine grains having an average grain diameter of 100 nm or less are dispersed and precipitated in a parent phase crystal grain.

(II) Another aspect of the present invention provides a process for producing the above alloy member, the process comprising:

a raw material mixing and melting step of mixing and melting raw materials of the alloy to form a molten metal;

an atomizing step of forming an alloy powder from the molten metal; and an additive manufacturing step of forming an alloy laminated molded body having a desired shape by a metal powder additive manufacturing process using the alloy powder.

(III) Still another aspect of the present invention provides a process for producing the above alloy member, the process comprising:

a raw material mixing and melting step of mixing and melting raw materials of the alloy to form a molten metal;

an atomizing step of forming an alloy powder from the molten metal;

an additive manufacturing step of forming an alloy laminated molded body having a desired shape by a metal powder additive manufacturing process using the alloy powder; and a pseudo solution heat treatment step of performing pseudo solution heat treatment on the alloy laminated molded body in a temperature range of 1080° C. or more and 1180° C. or less.

(IV) Still another embodiment of the present invention provides a product comprising the above alloy member,
wherein the product is an impeller of a fluid machine.

The present application claims priority to Japanese Patent Application No. 2017-154657, the content of which is incorporated in its entirety herein.

Advantageous Effects of Invention

The present invention can provide an alloy member that is excellent in homogeneity of both the alloy composition and microstructure and excellent in shape controllability and includes a high entropy alloy having high mechanical properties and high corrosion resistance, a process for producing the same, and a product including the alloy member.

DESCRIPTION OF EMBODIMENTS

In the present invention, the following improvements and modifications can be made on the above-described alloy member (I).
(i) The parent phase crystal grains have an average crystal grain diameter of 100 μm or less.
(ii) The ultrafine grains are crystalline grains in which the Ni component and the Ti component are more enriched than in the parent phase crystals.
(iii) The chemical composition comprises 20 atomic % or more and 35 atomic % or less of Co; 10 atomic % or more and 25 atomic % or less of Cr; 10 atomic % or more and 25 atomic % or less of Fe; 15 atomic % or more and 30 atomic % or less of Ni; and 5 atomic % or more and 15 atomic % or less of Ti.
(iv) The chemical composition comprises 25 atomic % or more and 33 atomic % or less of Co; 15 atomic % or more and 23 atomic % or less of Cr; 15 atomic % or more and 23 atomic % or less of Fe; 17 atomic % or more and 28 atomic % or less of Ni; 5 atomic % or more and 10 atomic % or less of Ti; and 1 atomic % or more and 7 atomic % or less of Mo.
(v) The chemical composition comprises 25 atomic % or more and less than 30 atomic % of Co; 15 atomic % or more and less than 20 atomic % of Cr; 15 atomic % or more and less than 20 atomic % of Fe; 23 atomic % or more and 28 atomic % or less of Ni; 7 atomic % or more and 10 atomic % or less of Ti; and 1 atomic % or more and 7 atomic % or less of Mo.
(vi) The chemical composition comprises 30 atomic % or more and 33 atomic % or less of Co; 20 atomic % or more and 23 atomic % or less of Cr; 20 atomic % or more and 23 atomic % or less of Fe; 17 atomic % or more and less than 23 atomic % of Ni; 5 atomic % or more and less than 7 atomic % s of Ti; and 1 atomic % or more and 3 atomic % or less of Mo.
(vii) The alloy member has a tensile strength of 1100 MPa or more and a breaking elongation of 10% or more. The upper limit of the tensile strength is not particularly limited, but it can be 1500 MPa, for example. The upper limit of the breaking elongation is not particularly limited either, but it can be set to 40%, for example.
(viii) The parent phase crystals have a columnar crystal shape and the crystal structure thereof comprises at least one of a simple cubic system and a face-centered cubic system.
(ix) The parent phase crystals have an equiaxed crystal shape and the crystal structure thereof comprises at least one of a simple cubic system and a face-centered cubic system.

In the present invention, the following improvements and modifications can be made on the above-described process (III) for producing the alloy member.
(x) The pseudo solution heat treatment step is a step of holding the alloy laminated molded body in the temperature range and then cooling the resultant with water or air.

In the present invention, the following improvements and modifications can be made on to the above-described processes (II) and (III) for producing the alloy member.
(xi) The heat source used for the metal powder additive manufacturing process in the additive manufacturing step is laser light.

In the present invention, the following improvements and modifications can be made on the product (IV) including the above-described alloy member.
(xii) The product is a centrifugal compressor in which the impeller is incorporated.

(Basic Idea of the Present Invention)

As described above, the high entropy alloy (HEA) has attractive characteristics which cannot be obtained by conventional alloys (for example, high hardness and temper softening resistance), but a problem thereof is that HEA was difficult to process to produce a desired shape member.

The inventors of the present invention have performed intensive studies on the alloy composition and the shape control process in order to develop an HEA member excellent in shape controllability and ductility without sacrificing the characteristics of HEA. As a result, it has been found that formation of the alloy laminated molded body by the electron beam additive manufacturing process using powder of a Co—Cr—Fe—Ni—Ti—Mo based alloy can provide a HEA member which is more excellent in shape controllability and ductility than the conventional ordinary forged HEA member.

Specifically, the HEA member has been found to be capable of obtaining in a near net shape and having good mechanical properties (for example, breaking elongation of 3% or more and tensile strength of 1000 MPa or more). However, in view of practical durability and long-term reliability in the HEA member and the mechanical apparatus using it, it is desirable that the HEA member have better ductility (for example, breaking elongation of 10% or more).

In order to realize a HEA member having desirable characteristics, the present inventors have performed further detailed investigations and studies on the relationship among the producing process, microstructure, and mechanical properties. As a result, it has been found that formation of an alloy laminated molded body by the laser additive manufacturing process can provide an HEA member which is more excellent in shape controllability and ductility than the HEA member molded by the electron beam additive manufacturing process.

It has been further found that application of a predetermined heat treatment to a molded body after the laser additive manufacturing can provide microstructure in which nanoscale ultrafine grains are dispersed and precipitated in parent phase crystal grains and can significantly improve mechanical strength and ductility. The present invention has been completed based on these findings.

Hereinafter, embodiments of the present invention will be described in accordance with the producing procedure of the HEA member with reference to the drawings. The present invention is not limited to the embodiments taken here, and combinations and improvements may be made as appropriate within a scope not deviating from the technical idea of the invention.

[Process for Producing HEA Member]

Figure 1:
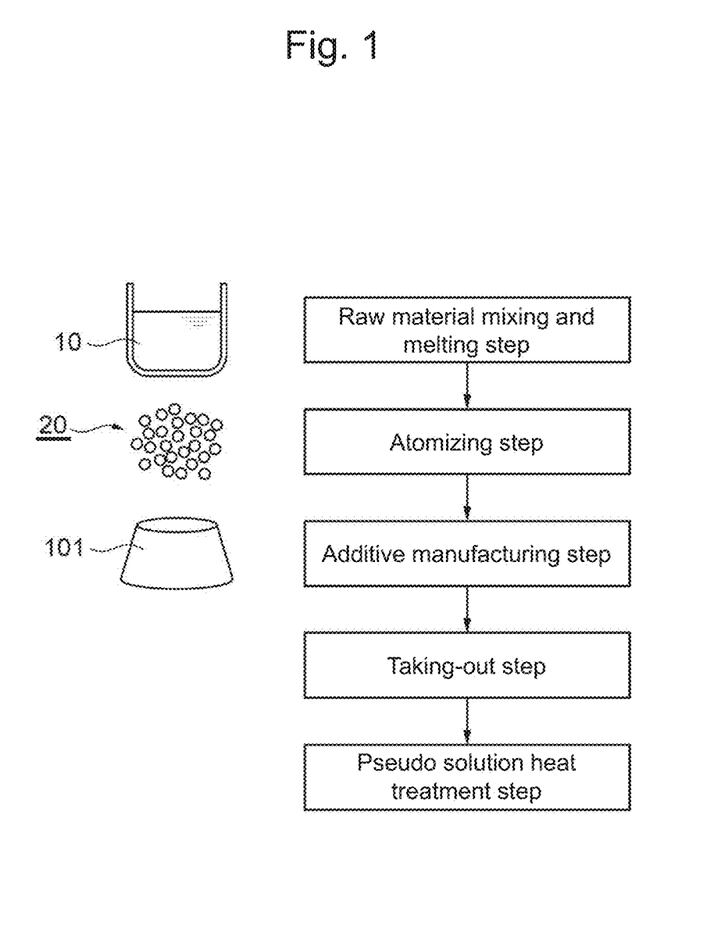
FIG. 1 is a process chart showing an example of a process for producing an alloy member according to the present invention.

FIG. 1 is a process chart showing an example of a process for producing an alloy member according to the present invention. As shown in FIG. 1, the production process of the present invention has a raw material mixing and melting step, an atomizing step, an additive manufacturing step, a taking-out step, and a pseudo solution heat treatment step. Hereinafter, embodiments of the present invention will be described more specifically.

(Raw Material Mixing and Melting Step)

As shown in FIG. 1, firstly, the raw material mixing and melting step is carried out wherein the raw materials are mixed to obtain a desired HEA composition (Co—Cr—Fe—Ni—Ti—Mo) and melted to form a molten metal 10. There are no particular limitations on the process of mixing and melting the raw materials, and conventional processes for producing the alloy having high strength and high corrosion resistance can be used. For example, vacuum melting can be suitably used as a melting process. It is also preferable to refine the molten metal 10 by using the vacuum carbon deoxidation process or the like in combination.

The HEA composition of the present invention includes five elements of Co, Cr, Fe, Ni, and Ti, as main components, each in an amount within the range of 5 atomic % or more and 35 atomic % or less, and includes Mo in an amount within a range of more than 0 atomic % to 8 atomic % or less as a subcomponent, the remainder consisting of unavoidable impurities.

More specifically, the Co component is preferably 20 atomic % or more and 35 atomic % or less, more preferably 25 atomic % or more and 33 atomic % or less. The Cr component is preferably 10 atomic % or more and 25 atomic % or less, more preferably 15 atomic % or more and 23 atomic % or less. The Fe component is preferably 10 atomic % or more and 25 atomic % or less, more preferably 15 atomic % or more and 23 atomic % or less. The Ni component is preferably 15 atomic % or more and 30 atomic % or less, more preferably 17 atomic % or more and 28 atomic % or less. The Ti component is preferably 5 atomic % or more and 15 atomic % or less, more preferably 5 atomic % or more and 10 atomic % or less. The Mo component is preferably more than 0 atomic % and 8 atomic % or less, more preferably 1 atomic % or more and 7 atomic % or less. Controlling to these composition ranges can achieve both improvement in ductility and improvement in mechanical strength. In other words, when each component deviates from their respective preferred composition ranges, it will be difficult to achieve desirable properties.

Within the above composition range described in the last paragraph, the Co component is more preferably 25 atomic % or more and less than 30 atomic %, the Cr component is more preferably 15 atomic % or more and less than 20 atomic %, the Fe component is more preferably 15 atomic % or more and less than 20 atomic %, the Ni component is more preferably 23 atoms % or more and 28 atomic % or less, the Ti component is more preferably 7 atomic % or more and 10 atomic % or less, and the Mo component is more preferably 1 atomic % or more and 7 atomic % or less, when emphasis is on the improvement of the mechanical strength.

Within the above composition range described in the second last paragraph, the Co component is more preferably 30 atomic % or more and 33 atomic % or less, the Cr component is more preferably 20 atomic % or more and 23 atomic % or less, the Fe component is more preferably 20 atomic % or more and 23 atomic % or less, the Ni component is more preferably 17 atoms % or more and less than 23 atomic %, the Ti component is more preferably 5 atomic % or more and less than 7 atomic %, and the Mo component is more preferably 1 atomic % or more and 3 atomic % or less, when emphasis is on the improvement of the ductility.

(Atomizing Step)

The atomization step of forming an alloy powder 20 from the molten metal 10 is performed. There is no particular limitation on the atomizing process, and conventional processes can be used. For example, a gas atomizing process or a centrifugal atomizing process can be preferably used.

The average grain diameter of the alloy powder 20 is preferably 10 μm or more and 200 μm or less, more preferably 10 μm or more and 50 μm or less, in view of handling property and filling property. When the average grain diameter is less than 10 μm, the alloy powder 20 is easily stirred up in the next additive manufacturing step, which is a factor of reducing shape accuracy of the alloy laminated molded body. On the other hand, when the average grain diameter exceeds 200 μm, the surface roughness of the alloy laminated molded body increases or the melting of the alloy powder 20 becomes insufficient in the next additive manufacturing step.

(Laminating Molding Step)

The additive manufacturing step of forming an alloy laminated molded body 101 having a desired shape is performed by the metal powder additive manufacturing process using the above-produced alloy powder 20. Application of the metal powder additive manufacturing process for molding a metal member of a near net shape along with melting and solidifying rather than sintering can produce a three-dimensional member having a hardness equal to or higher than that of a forged material and having a complicated shape. As an additive manufacturing process, a metal powder additive manufacturing process using a selective laser melting (SLM) process can be suitably used.

Figure 2:
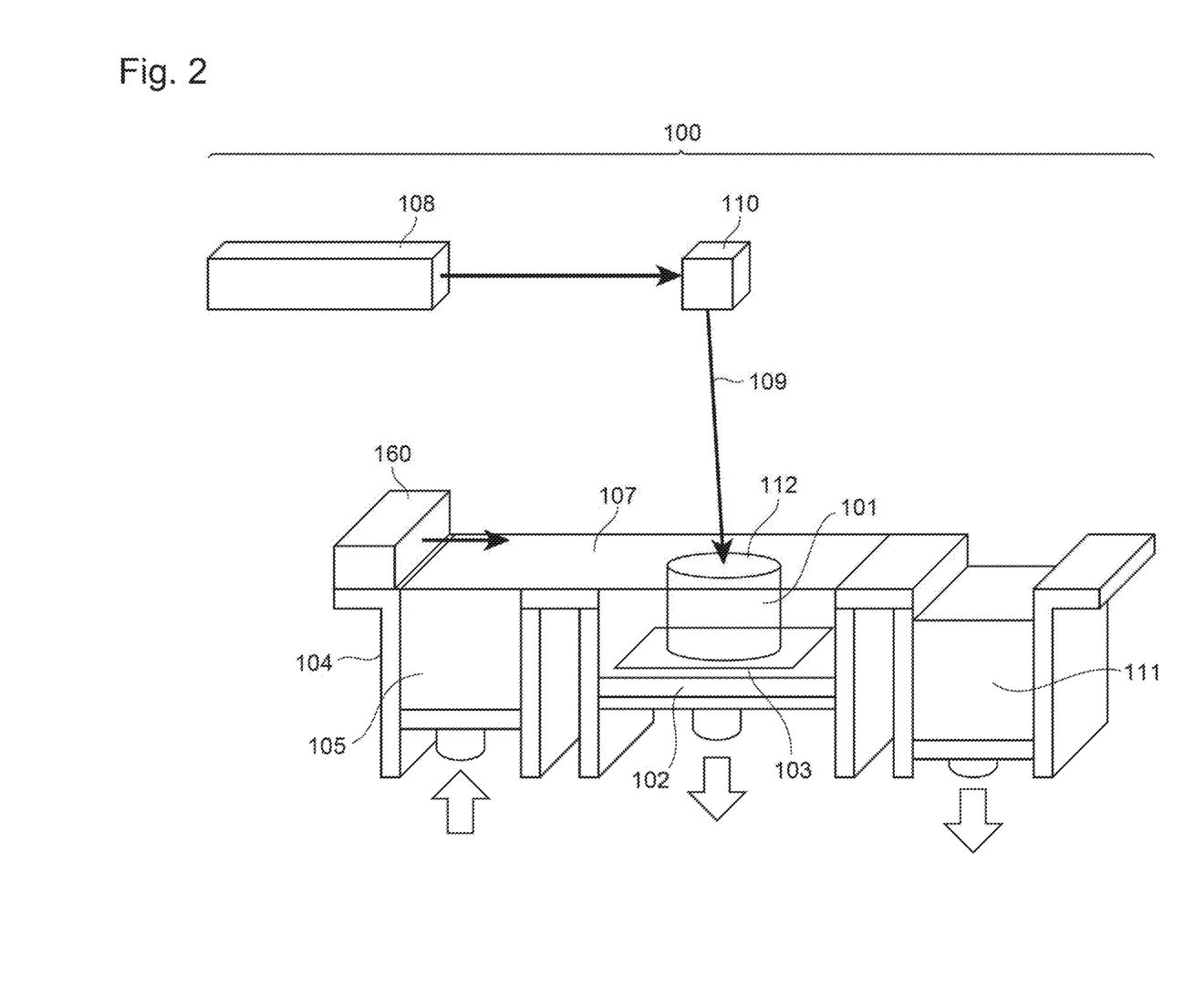
FIG. 2 is a schematic cross-sectional view showing an example of a configuration of a powder additive manufacturing apparatus for a laser beam melting process and an example of an additive manufacturing process.

The additive manufacturing step by the SLM process will be described. FIG. 2 is a schematic view showing a configuration of a powder additive manufacturing apparatus 100 according to the SLM process. A stage 102 is lowered by the thickness of one layer (for example, about 20 to 50 μm) of the alloy laminated molded body 101 to be molded. An alloy powder 105 is supplied from a powder supply container 104 onto a base plate 103 on the upper surface of the stage 102, and the alloy powder 105 is flattened by a recoater 160 to form a powder bed 107 (laminated powder).

Based on 2D slice data converted from 3D-CAD data of the alloy laminated molded body 101 to be molded, the unmelted powder on the base plate 103 is irradiated with a laser 109 output from a laser oscillator 108 through a galvanometer mirror 110 to form a micro-molten pool, which is then moved and sequentially solidified, whereby a solidified layer 112 in the form of a 2D slice is formed. The unmelted powder is recovered in a recovery container 111. Lamination is performed by repeating this operation to produce the alloy laminated molded body 101.

A specimen for microstructure observation was sampled from the alloy laminated molded body 101 after the taking-out step and the microstructure of the sample was observed using an electron microscope. As a result, the parent phase of the alloy laminated molded body 101 had a structure (so-called quenched solidified structure) in which fine columnar crystals (average width of 50 μm or less) were formed along the building direction of the alloy laminated molded body 101.

(Pseudo Solution Heat Treatment Step)

Heat treatment for rapidly cooling the alloy laminated molded body 101 as described above can be performed as appropriate after heating and holding at a stable temperature. The temperature of the present heat treatment is preferably in the range of 1080 to 1180° C., more preferably 1100 to 1140° C. When it is below 1080° C., needle crystals of an intermetallic compound phase precipitate, and when it exceeds 1180° C., the crystal grain diameter becomes coarse. In the present application, the heat treatment as described above is called pseudo solution heat treatment because of the following reasons: the solid solubility limit of the alloy is not clear, and ultrafine grains having an average grain diameter of 100 nm or less are dispersed and precipitated in the alloy member which is the final product.

It is preferable to maintain the alloy laminated molded body 101 within the temperature range for a suitable period and then quench (for example, air cooling or water cooling) the resultant. Particularly, allowing the alloy laminated molded body 101 to undergo a quick change of the temperature through a temperature range in which the intermetallic compound phase easily grows grain(for example, a temperature range of 900 to 800° C.) (for example, to cool at a rate of 10° C./s or more) provides a pseudo solution alloy molded body having the microstructure that nanoscale ultrafine grains are dispersed and precipitated. Performing the aging treatment step of maintaining the pseudo solution alloy molded body at a temperature lower than a temperature range in which the intermetallic compound phase easily grows grain(for example, a temperature range of 900 to 800° C.), for example, more than 500° C. to less than 900° C., the number of nanoscale ultrafine grains in the pseudo solution alloy molded body can be increased to further improve the strength.

The average grain diameter of the ultrafine grains dispersed and precipitated is preferably 100 nm or less, more preferably 20 nm or more and 80 nm or less. When the average grain diameter of ultrafine grains is 20 nm or more and 80 nm or less, the ductility and corrosion resistance are excellent, and the mechanical strength can be increased. When the average grain diameter of ultrafine grains exceeds 100 nm, the mechanical properties abruptly decrease.

[HEA Member]

Figure 3:
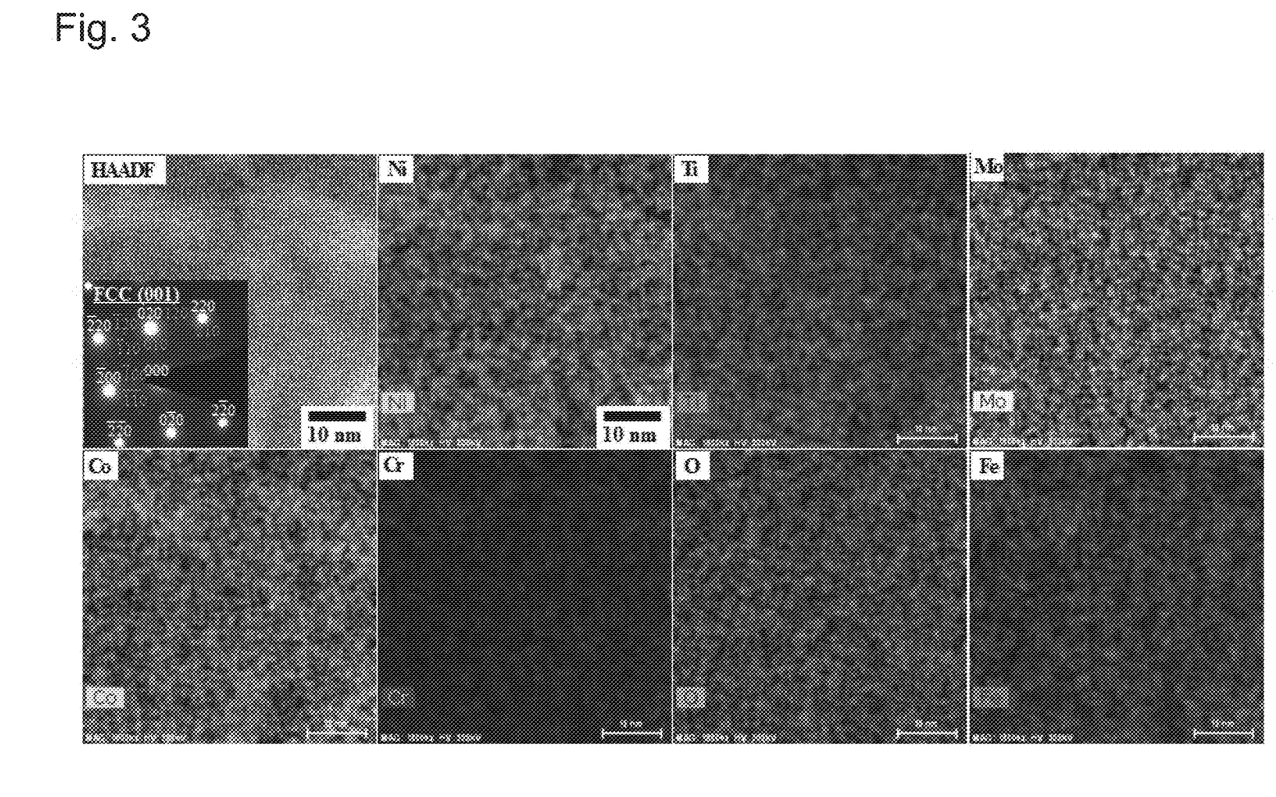
FIG. 3 is a high angle scattering annular dark field scanning transmission electron microscopic image (HAADF-STEM image) showing an example of a microstructure of a pseudo solution alloy molded body according to the present invention.

FIG. 3 shows an HAADF (High Angle Annular Dark Field) image of high magnification, element mapping images, and a diffraction pattern. In the diffraction pattern, a satellite pattern due to a fine ordered phase observed in the molded material subjected to the pseudo solution heat treatment was observed, but its presence could not be confirmed from the element mapping images. It is inferred from this finding that the solidification rate in the molded material is remarkably high and that the ordered phase is so ultrafine as to exceed the detection limit of STEM-EDX.

In order to investigate the microstructure of the pseudo solution alloy molded body in more detail, microstructure observation was carried out using STEM-EDX.

Figure 4A:
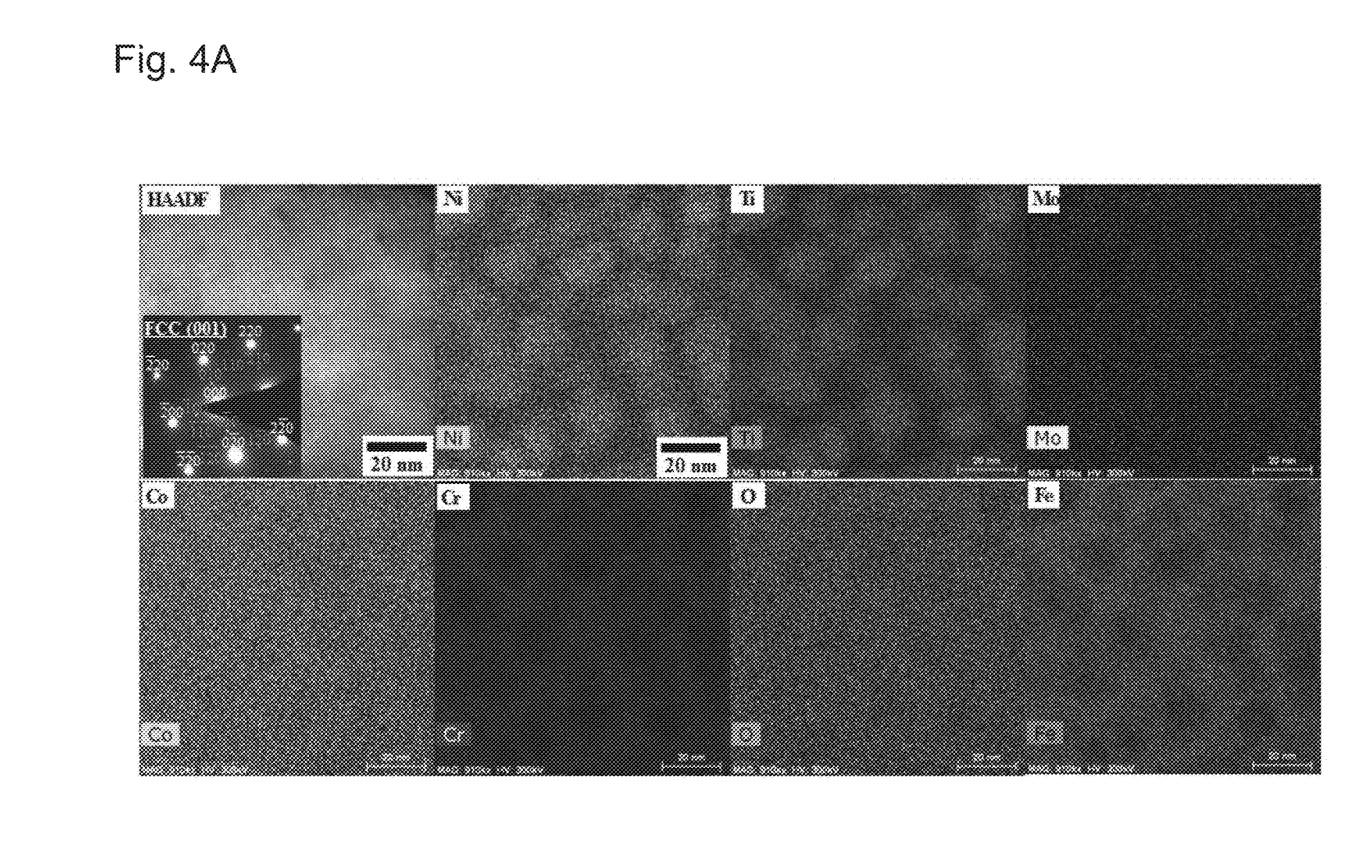
FIG. 4A is a high angle scattering annular dark field scanning transmission electron microscopic image (HAADF-STEM image) showing an example of a microstructure of a pseudo solution alloy molded body according to the present invention.

FIG. 4A shows an HAADF image, element mapping images, and a diffraction pattern of STEM-EDX for a molded material subjected to the solution heat treatment (water cooling). Satellite spots due to the ordered phase are observed in the diffraction pattern. From the element mapping images, Ni- and Ti-enriched fine grains having a diameter of slightly less than 20 nm were observed.

Figure 4B:
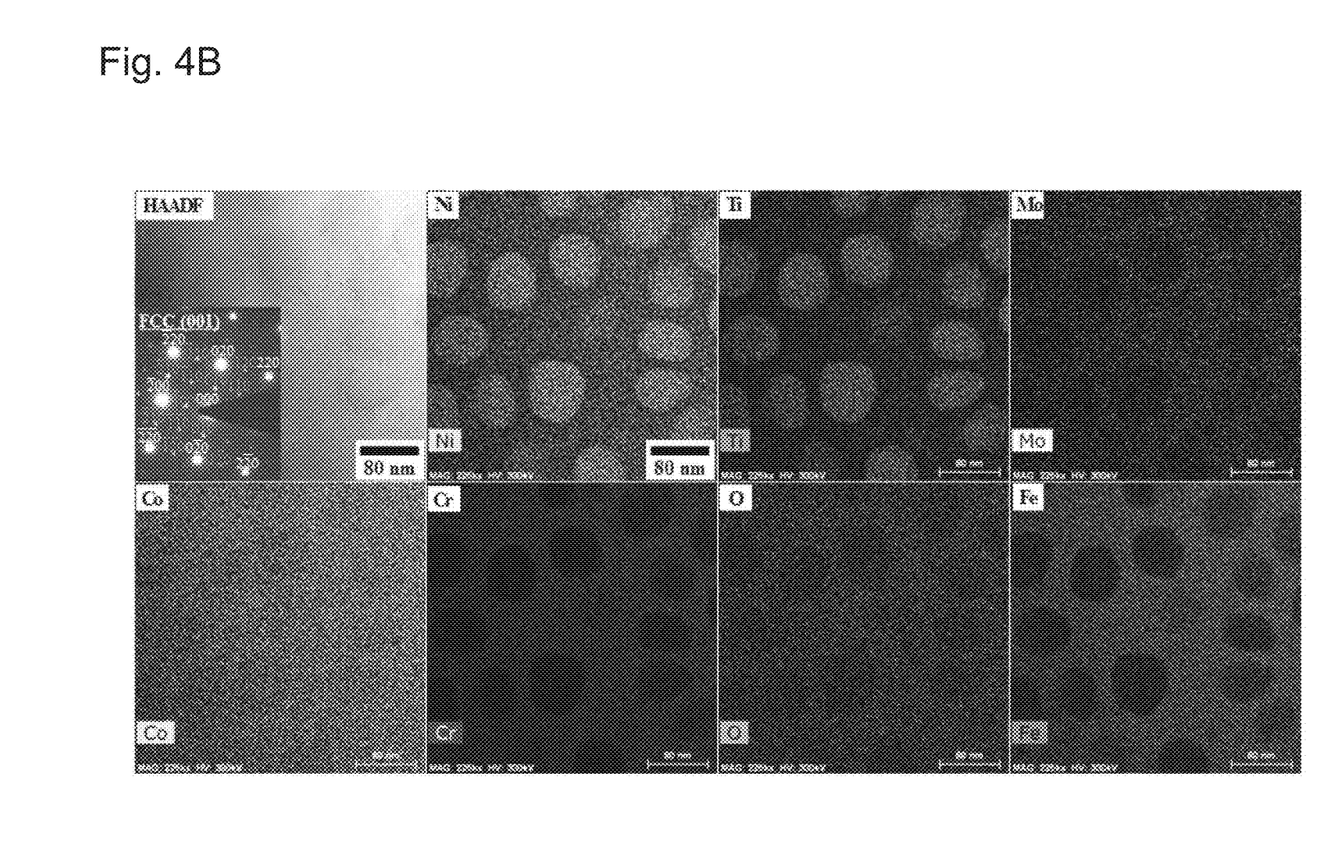
FIG. 4B is a high angle scattering annular dark field scanning transmission electron microscopic image (HAADF-STEM image) showing an example of a microstructure of a pseudo solution alloy molded body according to the present invention.

FIG. 4B shows an HAADF image, element mapping images, and a diffraction pattern of STEM-EDX for a molded material subjected to the solution heat treatment (air cooling). The satellite spot intensity appearing in the diffraction pattern is higher than that of the water-cooled material shown in FIG. 4A. The diameter of Ni- and Ti-enriched fine grains was more than three times larger than that of a water-cooled material and was about 70 nm.

[Product Including HEA Member]

Figure 5:
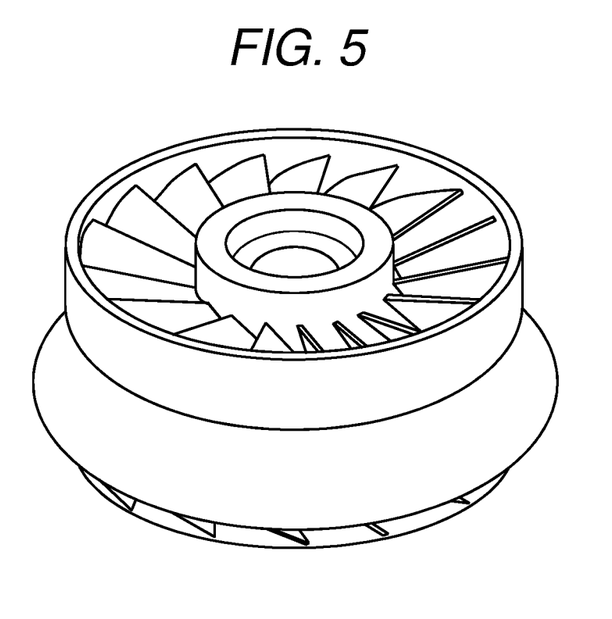
FIG. 5 is a photograph showing an impeller of a fluid machine, which is an example of a product including the alloy member according to the present invention.

FIG. 5 is a photograph showing an impeller of a fluid machine, which is an example of a product including the HEA member according to the present invention. Since the HEA product of the present invention is produced by the metal powder additive manufacturing process, even a complicated shaped object as shown in FIG. 5 can be easily molded. Since the impeller using the HEA member of the present invention has both high mechanical properties and high corrosion resistance, it can exhibit excellent durability under severe operating environments.

Figure 6:
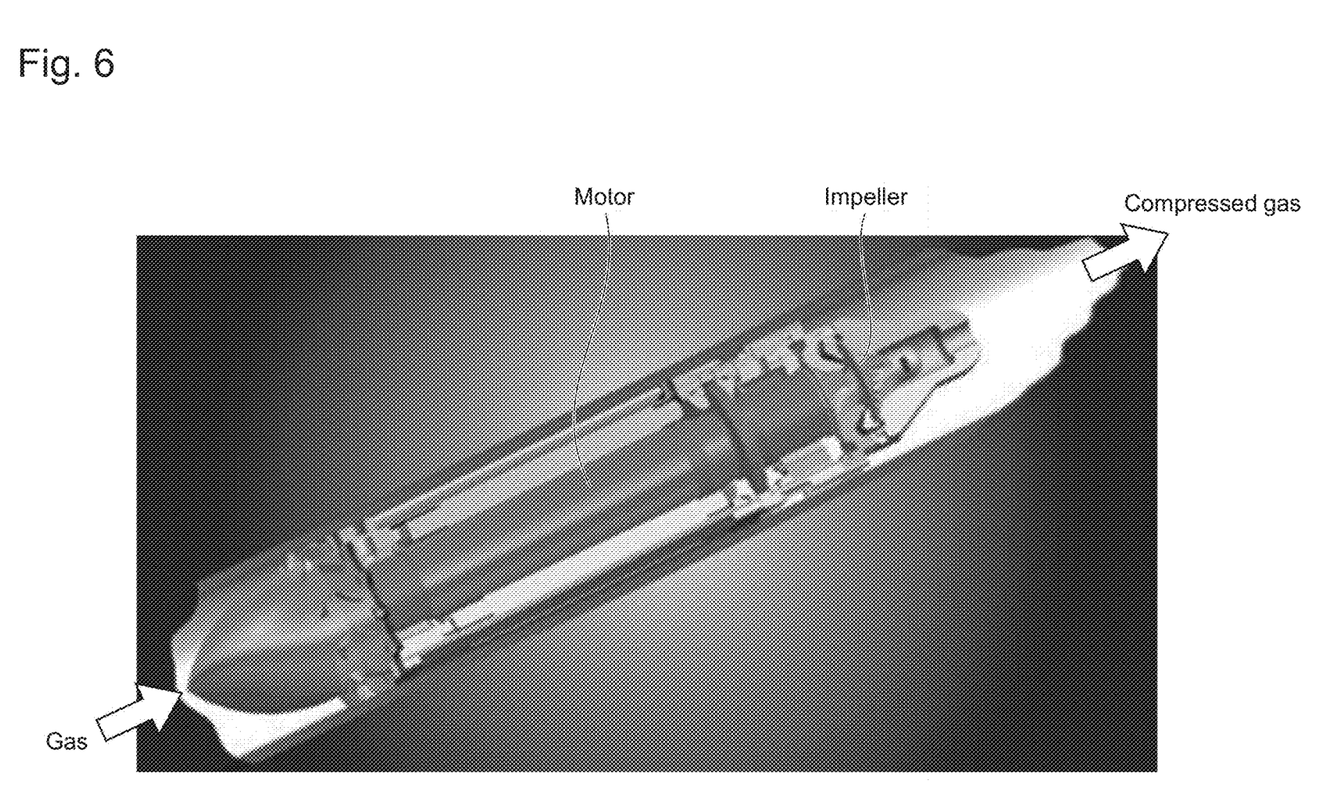
FIG. 6 is a schematic cross-sectional view showing a centrifugal compressor in which the impeller of the present invention is incorporated, which is another example of the product including the alloy member according to the present invention and showing.

FIG. 6 is a schematic cross-sectional view showing a centrifugal compressor in which the impeller of the present invention is incorporated, which is another example of the product including the HEA member according to the present invention. Use of the impeller of the present invention exhibiting excellent durability even in a severe operating environment can contribute to improvement of long-term reliability of the centrifugal compressor.

Examples

Hereinafter, the present invention will be described in more detail by way of Examples and Comparative Examples. The present invention is not limited to these examples.

[Experiment 1]

(Preparation of HEA Powders P1 to P6)

The raw material mixing and melting step was performed: specifically, raw materials were mixed in the nominal composition shown in Table 1 and were melted by a vacuum melting process to form a molten metal. The atomizing step was then performed: specifically, alloy powder was formed from the molten metal by the gas atomizing process. The obtained alloy powder was then classified using a sieve and was sorted according to a grain diameter of 45 μm or less to provide HEA powders P1 to P6.

TABLE 1

Nominal compositions of HEA powders P1 to P6 (unit: atomic %)

| HEA powder | Co | Cr | Fe | Ni | Ti | Mo |
|---|---|---|---|---|---|---|
| P1 | 26.8 | 17.9 | 17.9 | 26.8 | 8.9 | 1.8 |
| P2 | 26.3 | 17.5 | 17.5 | 26.3 | 8.8 | 3.5 |
| P3 | 25.4 | 17.0 | 17.0 | 25.4 | 8.5 | 6.8 |
| P4 | 25.0 | 16.7 | 16.7 | 25.0 | 8.3 | 8.3 |
| P5 | 28.9 | 19.2 | 19.2 | 23.1 | 7.7 | 1.9 |
| P6 | 31.3 | 20.8 | 20.8 | 18.8 | 6.3 | 2.1 |

[Experiment 2]
(Preparation of HEA Member M1S-SW and M1S-SA of Pseudo Solution Molded Body)

The HEA powder P1 prepared in Experiment 1 was subjected to the SLM process according to the procedure of the additive manufacturing step using a powder additive manufacturing apparatus (EOSINT M280 manufactured by EOS GmbH) as shown in FIG. 2 to mold an alloy laminated molded body (a prismatic material of 25 mm×25 mm×70 mm in height; a building direction is in the height direction).

After the additive manufacturing step, an HEA member M1S of the alloy laminated molded body was taken out.

After the taking-out step, the HEA member M1S was subjected to the pseudo solution heat treatment (maintaining it in the atmosphere at a temperature of 1120° C. for 3 hours and then quenching it) to produce an HEA member M1S-S of the pseudo solution molded body. The high-temperature HEA member taken out from a furnace was immersed in purified water at room temperature and cooled with water as a quenching process, and this sample was designated as an HEA member M1S-SW. Separately, the high-temperature HEA member was placed on a ceramic plate for air cooling as a quenching process and, this sample was designated as an HEA member M1S-SA.

(Preparation of HEA Members M2S-SW, M2S-SA to M6S-SW, and M6S-SA of Pseudo Solution Molded Body)

The HEA powders P2 to P6 were subjected to the additive manufacturing step, the taking-out step, and the pseudo solution heat treatment step in the same manner as above to produce HEA members M2S-SW to M6S-SW and M2S-SA to M6S-SA of the pseudo solution molded body.

[Experiment 3]
(Preparation of HEA Members M1S to M6S of the Alloy Laminated Molded Body)

The HEA powders P1 to P6 prepared in Experiment 1 were subjected to the additive manufacturing step and the taking-out step in the same manner as above to produce HEA members M1S to M6S of the alloy laminated molded body. These alloy laminated molded bodies are samples which are not subjected to the pseudo solution heat treatment step and serve as reference samples for confirming the influence of the pseudo solution heat treatment.

(Preparation of HEA Members M1F to M4F of Ordinary Forged Material)

The HEA powders P1 to P4 prepared in Experiment 1 were subjected to the arc melting process using water-cooled copper mold to forge an ingot (prismatic material having a width of 14 mm, a length of 80 mm, and a height of 20 mm) to produce ordinary forged HEA members M1F to M4F. In order to minimize element segregation and tissue spot during forging, melting was repeated 5 times or more. Then, after heating and holding at 950° C. for 15 minutes in the atmosphere, the hot forging step by press working was repeated twice under the conditions of the compression ratio of 30% and the compression rate of 30 mm/s. The cooling after hot forging was air cooling. These ordinary forged members are samples which are not subjected to the additive manufacturing step and serve as reference samples for confirming the influence of the metal powder additive manufacturing.

(Preparation of HEA Member M1S-SW-A of the Pseudo Solution Molded Body)

In order to control the ultrafine grains dispersed and precipitated in the parent phase crystals, the HEA members M1S-SW prepared in Experiment 2 were further subjected to the aging treatment (maintaining it in the atmosphere at temperatures of 600° C., 700° C., and 800° C. for 1 hour and then air cooling it) to obtain HEA members M1S-SW-A600, M1S-SW-A700, and M1S-SW-A800 of the pseudo solution molded body. As Comparative Example, HEA members M1S-SW-A500 and M1S-SW-A900 of the pseudo solution molded body were produced by the aging treatment that maintains them in the atmosphere at temperatures of 500° C. and 900° C. for 1 hour.

[Experiment 4]
(Microstructure Observation of HEA Member)

A specimen for microstructure observation was sampled from each of the HEA members produced above and microscopic observation was performed using an optical microscope, various electron microscopes (SEM, TEM, and STEM-EDX), and X-ray diffractometer (XRD). Table 2 shows the microstructure observation results together with the production specification of each HEA member.

TABLE 2

| | | | Parent phase structure | | Precipitate | | |
|---|---|---|---|---|---|---|---|
| HEA member | HEA powder | Pseudo solution heat treatment (quenching process) | Crystal shape (crystal structure) | Average grain diameter | Main precipitate phase (shape) | Precipitation form | Average grain diameter of precipitate |
| M1F | P1 | no | Equiaxed crystal (SC + FCC) | About 150 μm | Ni$_3$Ti (needle crystal) | Collected in disorder | — |
| M1S | | | Columnar crystal (SC + FCC) | About 40 μm | — | — | — |

TABLE 2-continued

Production specification and microstructure observation results of each HEA member

| HEA member | HEA powder | Pseudo solution heat treatment (quenching process) | Parent phase structure | | Precipitate | | |
|---|---|---|---|---|---|---|---|
| | | | Crystal shape (crystal structure) | Average grain diameter | Main precipitate phase (shape) | Precipitation form | Average grain diameter of precipitate |
| M1S-SW | | yes (water cooling) | Equiaxed crystal (SC + FCC) | About 60 μm | Ni—Ti—Co alloy (ultrafine grain) | Dispersed | 20 nm |
| M1S-SA | | yes (air cooling) | | About 80 μm | | | 70 nm |
| M1S-SW-A500 | | *yes (water cooling) | | About 60 μm | | | 20 nm |
| M1S-SW-A600 | | | | About 60 μm | | | 30 nm |
| M1S-SW-A700 | | | | About 60 μm | | | 60 nm |
| M1S-SW-A800 | | | | About 80 μm | | | 80 nm |
| M1S-SW-A900 | | | | About 100 μm | | | 105 nm |
| M2F | P2 | no | Equiaxed crystal (SC + FCC) | About 150 μm | Ni$_3$Ti (needle crystal) | Collected in disorder | — |
| M2S | | | Columnar crystal (SC + FCC) | About 40 μm | — | — | — |
| M2S-SW | | yes (water cooling) | Equiaxed crystal (SC + FCC) | About 60 μm | Ni—Ti—Co alloy (ultrafine grain) | Dispersed | 20 nm |
| M2S-SA | | yes (air cooling) | | About 80 μm | | | 70 nm |
| M3F | P3 | no | Equiaxed crystal (SC + FCC) | About 150 μm | Ni$_3$Ti (needle crystal) | Collected in disorder | — |
| M3S | | | Columnar crystal (SC + FCC) | About 40 μm | — | — | — |
| M3S-SW | | yes (water cooling) | Equiaxed crystal | About 60 μm | Ni—Ti—Co alloy (ultrafine grain) | Dispersed | 20 nm |
| M3S-SA | | yes (air cooling) | (SC + FCC) | About 80 μm | | | 70 nm |
| M4F | P4 | no | Equiaxed crystal (SC + FCC) | About 150 μm | Ni$_3$Ti (needle crystal) | Collected in disorder | — |
| M4S | | | Columnar crystal (SC + FCC) | About 40 μm | — | — | — |
| M4S-SW | | yes (water cooling) | Equiaxed crystal | About 60 μm | Ni—Ti—Co alloy (ultrafine grain) | Dispersed | 20 nm |
| M4S-SA | | yes (air cooling) | (SC + FCC) | About 80 μm | | | 70 nm |
| M5S-SW | P5 | yes (water cooling) | Equiaxed crystal | About 60 μm | Ni—Ti—Co alloy (ultrafine grain) | Dispersed | 20 nm |
| M5S-SA | | yes (air cooling) | (SC + FCC) | About 80 μm | | | 70 nm |
| M6S-SW | P6 | yes (water cooling) | Equiaxed crystal | About 60 μm | Ni—Ti—Co alloy (ultrafine grain) | Dispersed | 20 nm |
| M6S-SA | | yes (air cooling) | (SC + FCC) | About 80 μm | | | 70 nm |

*With aging treatment after pseudo solution heat treatment

As shown in Table 2, regarding the parent phase structure, the ordinary forged HEA members M1F to M4F had a structure consisting of equiaxed crystals having an average grain diameter of about 150 μm. As a result of the XRD measurement, the crystal structure of the equiaxed crystal was a mixture of simple cubic (SC) and face-centered cubic (FCC) (in other words, it clearly contained FCC).

The parent phase structure of the HEA members M1S to M4S of the alloy laminated molded body had a structure in which fine columnar crystals (average grain diameter of 40 μm or less) (so-called local quenching solidified structure) were forested along the building direction of the laminated molded body. As a result of the XRD measurement, the crystal structure of the columnar crystal was a mixture of simple cubic (SC) and face-centered cubic (FCC) (in other words, it clearly contained FCC). The columnar crystal referred to here is defined as a crystal having a ratio of the major axis length to the minor axis length of the crystal grain of 2 or more.

The parent phase structure of the HEA member of the pseudo solution molded body had an equiaxed crystal shape, but the average crystal grain diameter was slightly different depending on the quenching process of the pseudo solution heat treatment and the presence or absence of the aging treatment. Specifically, in the samples that were water-cooled as the quenching process (M1S-SW to M6S-SW), the average grain diameter of the parent phase crystals was about 60 μm. In the samples that were air-cooled as the quenching process (M1S-SA to M6S-SA), the average grain diameter of the parent phase crystals was about 80 μm. The samples subjected to the aging treatment after the pseudo solution heat treatment (M1S-SW-A500, A600, and A700) had an average grain diameter of the parent phase crystals of about 60 µm, which was the same as that of M1S-SW. The sample subjected to the aging treatment after the pseudo solution heat treatment (M1S-SW-A800) had an average grain diameter of the parent phase crystals of about 80 µm. The sample subjected to the aging treatment after the pseudo solution heat treatment (M1S-SW-A900) had an average grain diameter of the parent phase crystals of about 100 µm. As a result of the XRD measurement, the crystal structure of these equiaxed crystals was a mixture of simple cubic (SC) and face-centered cubic (FCC) (in other words, they clearly contained FCC). It was confirmed by TEM and STEM-EDX that fine grains having an average grain diameter of 100 nm or less existed in these parent phase crystals and Ni component and Ti component were more enriched in these fine grains than in the parent phase crystals.

[Experiment 5]

(Measurement of Mechanical Properties and Corrosion Resistance of HEA Member)

A specimen (parallel part diameter: 4 mm and parallel part length: 20 mm) for a tensile test was sampled from each of the HEA members produced above. The specimens of HEA members of the alloy laminated molded body and the pseudo solution alloy molded body were sampled so that the longitudinal direction of the specimen is in accordance with the building direction.

For each specimen, a room temperature tensile test was carried out using a material universal testing machine (according to JIS Z 2241, strain rate: $5 \times 10^{-5} s^{-1}$), and tensile strength and breaking elongation were measured. The measurement result of the tensile test was obtained as the average value of three observed values excluding the maximum observed value and the minimum observed value among quintuplicate measurements. In the evaluation of the tensile strength, 1100 MPa or higher was judged as "passed", and less than 1100 MPa was judged as "failed". In the evaluation of the breaking elongation, 10% or more was judged as "passed", and less than 10% was judged as "failed". The results are shown in Table 3 below.

A polarization specimen (15 mm long×15 mm wide×2 mm thick) for pitting corrosion test was sampled from each of the HEA members produced above. The pitting corrosion test was carried out according to JIS G 0577 for each polarization specimen. Specifically, the anode polarization curve of the polarization specimen was obtained in the conditions of "test area: 1 cm$^2$, electrode for preventing crevice corrosion mounted on a polarization specimen, reference electrode: saturated silver-silver chloride electrode, test solution: 3.5% sodium chloride aqueous solution deaerated with argon gas, test temperature: 80° C., and potential sweep rate: 20 mV/min" to determine the electric potential corresponding to a current density of 100 µA/cm$^2$ when the pitting corrosion occurred. In the evaluation of the electric potential when the pitting corrosion occurred, 0.50 V or more was judged to be "passed", and less than 0.50 V was judged to be "failed". The results of the pitting corrosion test are also shown in Table 3.

TABLE 3

Measurement results of mechanical properties and corrosion resistance of each HEA member

| | Mechanical property | | | | Corrosion resistance | |
| --- | --- | --- | --- | --- | --- | --- |
| HEA member | Tensile strength (MPa) | Passed or failed | Breaking elongation (%) | Passed or failed | Electric potential when pitting corrosion occurrs (V vs. Ag/AgCl) | Passed or failed |
| M1F | 950 | Failed | 4.5 | | 0.55 | Passed |
| M1S | 1210 | Passed | 26 | Passed | 0.88 | Passed |
| M1S-SW | 1320 | Passed | 27 | Passed | 1.0 | Passed |
| M1S-SA | 1450 | Passed | 14 | Passed | 0.80 | Passed |
| M1S-SW-A500 | 1320 | Passed | 25 | Passed | 1.0 | Passed |
| M1S-SW-A600 | 1510 | Passed | 15 | Passed | 0.91 | Passed |
| M1S-SW-A700 | 1590 | Passed | 13 | Passed | 0.90 | Passed |
| M1S-SW-A800 | 1480 | Passed | 11 | Passed | 0.72 | Passed |
| M1S-SW-A900 | 450 | Failed | 1.1 | Failed | 0.53 | Passed |
| M2F | 900 | Failed | 2.5 | Failed | 0.53 | Passed |
| M2S | 1131 | Passed | 23 | Passed | 0.82 | Passed |
| M2S-SW | 1220 | Passed | 20 | Passed | 1.0 | Passed |
| M2S-SA | 1320 | Passed | 12 | Passed | 0.95 | Passed |
| M3F | 825 | Failed | 1.2 | Failed | 0.54 | Passed |
| M3S | 1210 | Passed | 20 | Passed | 0.89 | Passed |
| M3S-SW | 1210 | Passed | 18 | Passed | 0.91 | Passed |
| M3S-SA | 1302 | Passed | 11 | Passed | 0.81 | Passed |
| M4F | 710 | Failed | 0.8 | Failed | 0.54 | Passed |
| M4S | 1030 | Failed | 8.2 | Failed | 0.58 | Passed |
| M4S-SW | 1080 | Failed | 6.3 | Failed | 0.87 | Passed |
| M4S-SA | 1025 | Failed | 3.2 | Failed | 0.89 | Passed |
| M5S | 1150 | Passed | 32 | Passed | 0.90 | Passed |
| M5S-SW | 1305 | Passed | 28 | Passed | 1.0 | Passed |
| M5S-SA | 1380 | Passed | 20 | Passed | 0.98 | Passed |
| M6S | 1110 | Passed | 38 | Passed | 0.89 | Passed |
| M6S-SW | 1150 | Passed | 30 | Passed | 1.0 | Passed |
| M6S-SA | 1250 | Passed | 25 | Passed | 0.97 | Passed |

As shown in Table 3, the ordinary forged HEA members M1F to M4F, which are samples not subjected to the additive manufacturing step, had a tensile strength of less than 1100 MPa and a breaking elongation of less than 10%, and failed in mechanical properties. It has been demonstrated that the HEA members M1S to M3S and M5S to M6S of the alloy laminated molded body, which are samples subjected to the additive manufacturing step but not subjected to the pseudo solution heat treatment step had a tensile strength of 1100 MPa or more and a breaking elongation of 10% or more, and exhibited good mechanical properties.

The HEA member produced using the HEA powder P4 whose alloy composition (amount of Mo) was in accordance with the present invention failed in mechanical properties regardless of the producing process. This result confirmed that Mo addition exceeding 8 atomic % was not preferable.

In each of the HEA members M1S-SW-A600, M1S-SW-A700, and M1S-SW-A800, which aimed for the growth of fine grains by applying the aging treatment after the pseudo solution heat treatment, the average grain diameter of the precipitate became larger than that of the M1S-SW without the aging treatment, and the breaking elongation was kept at 10% or more, improving the tensile strength. On the other hand, the characteristics of the HEA member M1S-SW-A500 for which the aging treatment temperature was 500° C. after the pseudo solution heat treatment were equivalent to those of H1S-SW without the aging treatment, and the HEA member M1S-SW-A900 (the average grain diameter of ultrafine grains exceeding 100 nm) for which the aging treatment temperature was 900° C. remarkably decreased mechanical properties. This result confirmed that the average grain diameter of ultrafine grains dispersed and precipitated in the parent phase crystals was preferably 100 nm or less.

It was demonstrated that the HEA members M1S-SW to M3S-SW, M1S-SA to M3S-SA, M5S-SW to M6S-SW, and M5S-SA to M6S-SA of the pseudo solution alloy molded body had a tensile strength of 1100 MPa or more, a breaking elongation of 10% or more, and good mechanical properties.

More specifically, it was confirmed that the HEA members M6S-SW and M6S-SA produced using the HEA powder P6 having a relatively low content of the Ni component and the Ti component had a breaking elongation of 25% or more and particularly excellent ductility. In addition, it was confirmed that the HEA members M1S-SW, M1S-SA to M3S-SW, M3S-SA and M5S-SW, and M5S-SA produced using the HEA powders P1 to P3 and P5 having higher contents of the Ni component and Ti component than the HEA powder P6 had a tensile strength of 1200 MPa or more and mechanical strength was particularly excellent.

Regarding corrosion resistance, on the other hand, it was confirmed that all the HEA members provided an electric potential when the pitting corrosion occurs of 0.50 V or more vs. Ag/AgCl and had excellent corrosion resistance regardless of the producing process and microstructure. In other words, the HEA member of the present invention is considered to have excellent corrosion resistance by the combination of the elements themselves (Co—Cr—Fe—Ni—Ti—Mo). Since the HEA member of the pseudo solution alloy molded body according to the embodiment of the present invention provided a higher electric potential when pitting corrosion occurs than the other HEA members, the HEA member according to the embodiment of the present invention is expected to have higher corrosion resistance.

[Experiment 6]
(Preparation and Inspection of Product Including HEA Member)

An impeller shown in FIG. 5 was produced by the same procedure as the process for producing the HEA member M1E-SW of the pseudo solution alloy molded body. The obtained impeller was subjected to internal defect inspection by X-ray CT scan and dimension measurement. As a result, no internal defects which adversely affected the mechanical properties were observed and no deformation with respect to the designed dimensions was observed. This experiment confirmed the effectiveness of the present invention.

The above-described embodiments and examples have been described to aid in understanding of the present invention, and the present invention is not limited only to the specific configuration described. For example, a part of the configuration of one embodiment can be replaced by the configuration of another embodiment, and the configuration of one embodiment can be added to the configuration of another embodiment. In other words, in the present invention, any configurations of the embodiments and examples herein can be deleted and replaced with other configurations, and other configurations can be added thereto.

REFERENCE SIGNS LIST

10 Molten metal
20 Alloy powder
100 SLM powder additive manufacturing apparatus
101 Alloy laminated molded body
102 Stage
103 Base plate
104 Powder supply container
105 Alloy powder
160 Recoater
107 Powder bed (laminated powder)
108 Laser oscillator
109 Laser
110 Galvanometer mirror
111 Unmelted powder recovery container
112 2D sliced solidified layer All publications, patents, and patent applications cited in this specification are incorporated herein by reference in their entirety.

The invention claimed is:

1. An alloy member having a chemical composition comprising:
   25 atomic % or more and 33 atomic % or less of Co;
   15 atomic % or more and 23 atomic % or less of Cr;
   15 atomic % or more and 23 atomic % or less of Fe;
   17 atomic % or more and 28 atomic % or less of Ni;
   5 atomic % or more and 10 atomic % or less of Ti; and
   1.8 atomic % or more and 7 atomic % or less of Mo, and
   wherein the alloy member further comprises ultrafine grains having an average grain diameter of 100 nm or less that are dispersed and precipitated in a parent phase crystal grain, and
   wherein the average crystal grain diameter of the parent phase crystal grain is 100 μm or less.

2. The alloy member according to claim 1, wherein the ultrafine grain is a crystalline grain in which the Ni component and the Ti component are more enriched than in the parent phase crystal.

3. The alloy member according to claim 1, wherein the chemical composition comprises 25 atomic % or more and less than 30 atomic % of Co; 15 atomic % or more and less than 20 atomic % of Cr; 15 atomic % or more and less than 20 atomic % of Fe; 23 atomic % or more and 28 atomic % or less of Ni; 7 atomic % or more and 10 atomic % or less of Ti; and 1.8 atomic % or more and 7 atomic % or less of Mo.

4. The alloy member according to claim 1, wherein the chemical composition comprises 30 atomic % or more and 33 atomic % or less of Co; 20 atomic % or more and 23 atomic % or less of Cr; 20 atomic % or more and 23 atomic % or less of Fe; 17 atomic % or more and less than 23 atomic % of Ni; 5 atomic % or more and less than 7 atomic % of Ti; and 1.8 atomic % or more and 3 atomic % or less of Mo.

5. The alloy member according to claim 1, wherein the alloy member has a tensile strength of 1100 MPa or more and a breaking elongation of 10% or more.

6. The alloy member according to claim 1, wherein the parent phase crystal has an equiaxed crystal shape and the crystal structure thereof comprises at least one of a simple cubic system and a face-centered cubic system.

7. A process for producing an alloy member, comprising:
- a raw material mixing and melting step comprising mixing and melting raw materials of an alloy composition to form a molten metal so that the alloy composition comprises:
  - 25 atomic % or more and 33 atomic % or less of Co;
  - 15 atomic % or more and 23 atomic % or less of Cr;
  - 15 atomic % or more and 23 atomic % or less of Fe;
  - 17 atomic % or more and 28 atomic % or less of Ni;
  - 5 atomic % or more and 10 atomic % or less of Ti; and
  - 1.8 atomic % or more and 7 atomic % or less of Mo, and;
- an atomizing step of forming an alloy powder from the molten metal; and
- an additive manufacturing step of forming an alloy laminated molded body having a desired shape by a metal powder additive manufacturing process using the alloy powder, and
- wherein the alloy member further comprises ultrafine grains having an average grain diameter of 100 nm or less that are dispersed and precipitated in a parent phase crystal grain, and
- wherein the average crystal grain diameter of the parent phase crystal grain is 100 μm or less.

8. The process for producing an alloy member according to claim 7,
- wherein the alloy member obtained through the additive manufacturing step has a parent phase crystal, and
- wherein the parent phase crystal has a columnar crystal shape and the crystal structure thereof comprises at least one of a simple cubic system and a face-centered cubic system.

9. A process for producing an alloy member comprising:
- a raw material mixing and melting step comprising mixing and melting raw materials of an alloy composition to form a molten metal so that the alloy composition comprises:
  - 25 atomic % or more and 33 atomic % or less of Co;
  - 15 atomic % or more and 23 atomic % or less of Cr;
  - 15 atomic % or more and 23 atomic % or less of Fe;
  - 17 atomic % or more and 28 atomic % or less of Ni;
  - 5 atomic % or more and 10 atomic % or less of Ti; and
  - 1.8 atomic % or more and 7 atomic % or less of Mo, and;
- an atomizing step of forming an alloy powder from the molten metal;
- an additive manufacturing step of forming an alloy laminated molded body having a desired shape by a metal powder additive manufacturing process using the alloy powder; and
- a pseudo solution heat treatment step of performing a pseudo solution heat treatment on the alloy laminated molded body in a temperature range of 1080° C. or more and 1180° C. or less, and
- wherein the alloy member further comprises ultrafine grains having an average grain diameter of 100 nm or less that are dispersed and precipitated in a parent phase crystal grain, and wherein the average crystal grain diameter of the parent phase crystal grain is 100 μm or less.

10. The process for producing an alloy member according to claim 9, wherein the pseudo solution heat treatment step is a step of holding the alloy laminated molded body in the temperature range, thereby forming a resultant, and then cooling the resultant with water or air.

11. The process for producing an alloy member according to claim 9, comprising an aging treatment step of performing an aging treatment in a temperature range of more than 500° C. and less than 900° C. after the pseudo solution heat treatment step.

12. The process for producing an alloy member according to claim 9, wherein the alloy member obtained through the pseudo solution heat treatment step has a parent phase crystal, and
- wherein the parent phase crystal has an equiaxed crystal shape and the crystal structure thereof comprises at least one of a simple cubic system and a face-centered cubic system.

\* \* \* \* \*